Aug. 7, 1962    F. BIEDERMANN ETAL    3,048,081
DEVICE FOR THE REPRODUCTION OF SOUND MOTION PICTURE FILMS
Filed Aug. 18, 1958    2 Sheets-Sheet 1
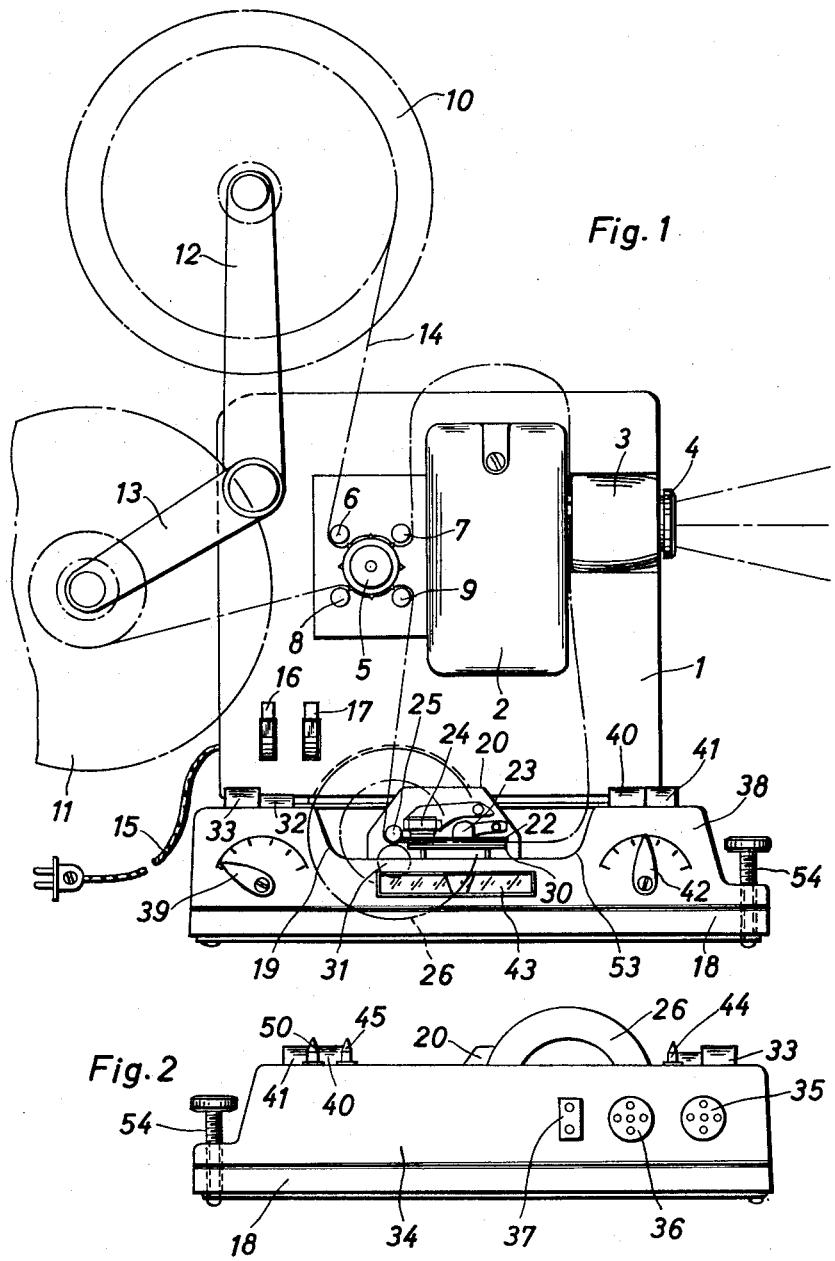
INVENTORS:
Friedrich Biedermann & Hans Pregl
BY
Connolly and Hutz
THEIR ATTORNEYS Aug. 7, 1962  F. BIEDERMANN ETAL  3,048,081
DEVICE FOR THE REPRODUCTION OF SOUND MOTION PICTURE FILMS
Filed Aug. 18, 1958  2 Sheets-Sheet 2

INVENTORS:
Friedrich Biedermann & Hans Pregl
BY
Connolly and Hutz
THEIR ATTORNEYS

United States Patent Office 3,048,081
Patented Aug. 7, 1962

3,048,081
DEVICE FOR THE REPRODUCTION OF SOUND MOTION PICTURE FILMS
Friedrich Biedermann, Unterhaching, Munich, and Hans Pregl, Munich, Germany, assignors to Agfa Aktiengesellschaft, Leverkusen-Bayerwerk, Germany, a corporation of Germany
Filed Aug. 18, 1958, Ser. No. 755,449
Claims priority, application Germany Aug. 28, 1957
5 Claims. (Cl. 88—16.2)

This invention relates to a projection device for reproducing sound motion picture films, and more particularly relates to such a device including a combination sound-recording and sound-reproducing unit through which is passed a motion picture film having a sound track applied to it.

A disadvantage of known devices for the reproduction of sound motion picture films is that the projection and reproduction units are combined in a single structural unit. This does not permit their separation, for example, by an amateur to permit separate and disconnected use of the projection and sound reproduction units.

An object of this invention is to provide a device for reproducing sound motion picture films which facilitates separate use of the projector and sound reproducing units.

In accordance with this invention, a device for reproducing sound motion picture films includes a film projection unit which can be used independently as a silent film projector. This projection unit is detachably mounted upon a separate base incorporating a combination sound-recording and sound-reproducing unit. Connecting means are provided upon the base for detachably connecting it to the projector. These connecting means are, for example, coupling means which are introduced into suitable slots or holes in the lower plate forming the base of the projection unit.

In accordance with a preferred embodiment of this invention, the sound-reproducing unit is incorporated in a relatively flat lectern-shaped or flat rectangular box-shaped casing. A recess is provided within the lower plate of the projection unit to permit a flywheel protruding above the upper plate of the sound-reproducing unit to be received within the projection unit.

Further in accordance with this invention, the sound-reproducing unit is constructed and arranged to permit convenient adjustment to a predetermined length of the length or loop of film between the projection and sound pick-up points. A surface of the sound-reproducing unit is accordingly utilized as a reference support for adjusting the length of film between the projection and sound pick-up points to this predetermined length.

Still further in accordance with this invention, the operative sound-recording and reproducing units, preferably magnetic heads, are disposed within a depression formed in the casing of the sound-reproducing unit.

In accordance with another feature of this invention, a plate or roller which engage the film with the sound-recording and sound-reproducing unit is connected with a manually operable control incorporated in the sound-reproducing device. Also, pushbutton switches may be provided on the sound unit for switching this unit from sound-recording to sound-reproducing operation. This manually operable film engagement control and pushbutton switches are preferably positioned upon the upper cover plate of the sound-reproducing unit, whereas additional control elements and indicating devices are disposed on an inclined front wall of the unit.

In accordance with another feature of this invention, electrical coupling means are provided upon the sound unit which engage with corresponding contact elements on the projector when it is mounted upon the sound unit.

Several inputs are provided upon the sound unit which can be alternately switched into the reproducing or recording unit by means of a selector switch. The sound unit can also be combined with a monitoring control. The sound-recording and reproducing unit may also include output means for connection with the input to the low- or audio-frequency amplifier of a radio.

Another feature of this invention is the incorporation of means for adjusting the height of one end of the sound-reproducing unit for correspondingly adjusting the position of a projection unit mounted upon it.

This invention accordingly permits a silent film projector to be easily combined with a sound-recording and reproducing unit without requiring drastic changes in the unit. The projector may, therefore, be used independently as a silent film projector if desired.

Novel features and advantages of the present invention will become apparent to one skilled in the art from a reading of the following description in conjunction with the accompanying drawings wherein similar reference characters refer to similar parts and in which:

FIG. 1 is a side view in elevation of one embodiment of this invention;

FIG. 2 is a side view in elevation of the opposite portion of the embodiment shown in FIG. 1;

Figure 3:
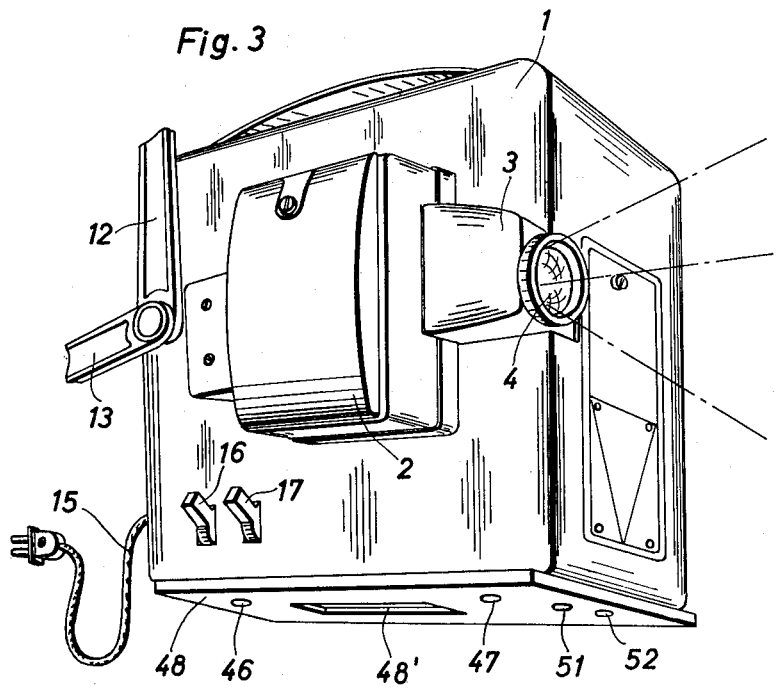
FIG. 3 is a perspective view of another portion of the embodiment shown in FIG. 1.

In FIGS. 1 and 3 is shown casing 1 of a silent film projector, for example, for projecting 8 mm. narrow gauge motion picture film. Upon one sidewall of projector casing 1 are positioned lamp housing 2, carrier 3 for projection lens 4 and also toothed film-feeding roller 5 which is surrounded by rigidly mounted film-guiding pins 6, 7, 8 and 9. Film supply reel 10 and film take-up reel 11, which are schematically represented in FIG. 1, are, for example, mounted upon casing 1 through arms 12 and 13 respectively. An electric motor (not shown) for driving toothed film-feeding roller 5 of the film pick-up unit (not shown) and reels 10 and 11 is mounted within projector casing 1.

Cable 15 is provided for connecting the projector with a source of electric power. Actuation, for example, the energizing, de-energizing and reversing, of the projector mechanism is accomplished, for example, by operation of one or more switches 16 mounted upon casing 1. Projection lamp 2 is, for example, switched on and off by switch 17.

Motion picture film 14, for example, having a magnetic sound track applied upon its edge is withdrawn from reel 10 in a forward direction and guided between pins 6 and 7 and toothed feeding roller 5 in a loose loop which passes through the aperture between lamp housing 2 and lens carrier 3. After leaving this aperture, film 14 is passed through a sound-recording and sound-reproducing device which is more specifically described in the following. After film 14 leaves the sound unit, it passes between pins 8 and 9 and toothed feeding roller 5 to take-up reel 11.

Figure 4:
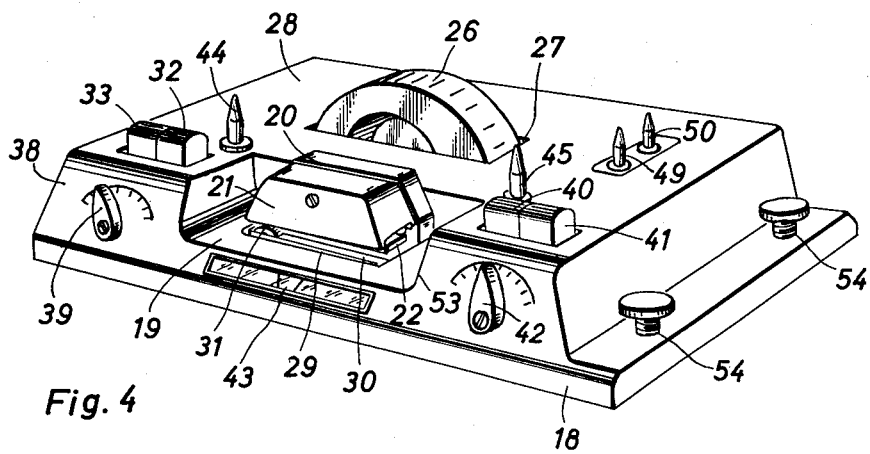
FIG. 4 is a perspective view of the portion of the embodiment shown in FIG. 2.

As shown in FIGS. 1, 2 and 4, the sound-recording and reproducing unit is constructed and arranged in a flat lectern-shaped or flat rectangular box-shaped casing 18. Casing 18 includes a depression 19 within which a relatively thick vertical fin 20 extends upwardly. A film-guiding plate 22, an erasing magnet 23, a recording and reproducing sound head 24 and a recording roller 25 are mounted upon fin or plate 20 under a removable cover plate 21 which is not shown in FIG. 1 to clarify the positions of these elements.

The axis of rotation (not shown) of recording roller 25 extends within casing 18. Flywheel 26 is mounted upon this axis of rotation and has a diameter which extends above the upper plate of casing 18 because of the relatively low and flat structure of the sound unit. Flywheel 26, therefore, protrudes upwardly through a hole or recess 27 provided within cover plate 28 of casing 18.

Film pressing plate 30 and pressing roller 31 are disposed within recess 29 in casing 18 mounted upon a joint carrier (not shown) and coupled through a linkage (also not shown) with control pushbuttons 32 and 33. When pushbutton 32 is pressed downwardly, pressing plate 30 and pressing roller 31 are raised to press film 14 against film guide plate 22, magnetic heads 23 and 24 and also against recording roller 25 as shown in FIG. 1. When film 14 is driven by toothed feed roller 5, it therefore, drives recording roller 25 and flywheel 26. This assures a motion of film 14 past magnetic heads 23 and 24 which is synchronized with the film being driven through the projecting unit, which synchronism is required for authentic sound reproduction.

When pushbutton 33 is depressed, it resets pushbutton 32 into the original position, thereby shifting pressing plate 30 and pressing roller 31 downwardly into the inactive position as shown in FIG. 4.

An electronic amplifier (not shown), disposed within casing 18 is connectable by a cable (not shown) with the input of the low- or audio-frequency section of a radio. This cable is plugged into socket 35 shown in FIG. 2 which is mounted upon the back wall 34 of casing 18. The provision of an audio amplifier or a loudspeaker within casing 18, are, therefore, not required. Socket 35 may also be used for connecting the sound-reproducing unit to a radio for recording radio broadcasts upon the magnetic sound track of film 14.

Furthermore, input socket 36 is mounted upon back wall 34 of casing 18 for connecting a microphone to the sound-reproducing unit, and input socket 37 is also provided for connecting other sound inputs, for example, sound track inputs.

Control knob 39 which is mounted upon inclined end wall 38 of casing 18 is, for example, a selector switch for alternately connecting microphone input 36 and other inputs 35 and 37 with the sound-recording and reproducing unit. Switching from one input to another is accomplished without noise peaks by suppressing one input source while the other is being connected into the circuit.

When pushbutton 40 is depressed, the sound-recording and reproducing unit is set for "recording" and when pushbutton 41 is depressed, the unit is set for "reproduction." Control knob 42 is, for example, used during recording for regulating the sound modulation and when reproducing for controlling volume. A recess 43 is provided within the inclined front wall 38 in casing 18 with a conventional volume indicator mounted within it.

The film-projecting unit is mounted upon casing 18 of the sound-recording and reproducing unit which serves as a base for it as shown in FIG. 1. Means are provided for detachably coupling the projector and sound units together, for example, by pins 44 and 45 extending upwardly from cover plate 28 of casing 18. These pins engage opening 46 and 47 of the bottom plate 48 of the projection unit. An opening 48' is provided, for example, within the center of bottom plate 48 to permit flywheel 26 to be received therein when the projector is set upon its base. This facilitates mounting of the projector unit upon the sound unit without interference from flywheel 26 which protrudes through cover plate 28 of casing 18.

Furthermore, a pair of electrical contact pins 49 and 50 extend upwardly from cover plate 28 and are preferably mounted in a resilient or flexible manner. These contact pins 49 and 50 are connected in the electrical circuit of the sound unit and engage within sockets 51 and 52 provided within bottom plate 48 of the projector. Sockets 51 and 52 are connected to a proper source of voltage for operating the sound unit which dispenses with the necessity for a special power supply unit for the sound unit. Control knob 42 may also serve as a main shut-off switch for the sound unit.

The film loop between the aperture formed between lamp housing 2 and lens carrier 3 and the recording and reproducing head 24 is, for example, as long as 56 frames of film. This permits the distance between the picture and sound pick-up points to correspond to the standard distance for 8 mm. sound motion picture film. This device is also suitable for the reproduction and projection of sound films recorded upon other devices.

The sound unit is constructed and arranged to maintain the film loop between the aperture and the recording and receiving head 24 at the aforementioned length once it is properly adjusted. This adjustment is made by threading film 14 through the film track through the aperture between lamp housing 2 and carrier 3 and through the sound pick-up point and then contacting the loop intermediate these points to the concave surface 53 formed within depression 19 of casing 18. While the film is stretched in this manner, pushbutton 32 is depressed to firmly engage film 14 between pressing plate 30 and guide plate 22 of the sound-reproducing unit. When film 14 is then released, it rises from surface 53 because of its resiliency, but the proper length of film is maintained between the projection and pick-up points from that time on.

Adjusting screws 54 are provided, for example, at one end of the sound unit to permit the base together with the projector units to be simultaneously adjusted for height. This permits the projector to be raised and lowered to direct its beam upon a screen without changing its position relative to the sound-producing unit.

Height-adjusting screws may also be arranged upon the bottom plate of the projector, but these are only used when the projector is used independently and are moved to an inactive position when the projector is mounted upon the sound unit base.

The projector and sound units may also be electrically connected by a special cable instead of utilizing contact pins 49 and 50 and sockets 51 and 52. The sound unit may also include a separate power connecting means including a separate cable to permit its connection to a power supply completely independently from the projector. Alternatively, the sound unit including inputs 35, 36 and 37 may also be used as a monitoring control unit.

What is claimed is:

1. A device for reproducing sound motion picture film comprising a film projection unit, a combination sound-recording and reproducing unit through which motion picture film having a sound track applied thereto is passed, said film projection and said combination sound-recording and reproducing units being incorporated within separate structural units to permit said film projection unit to be independently used as a silent film projector, film-projecting means mounted upon the side of said film projection unit, said units including detachable coupling means for connecting them together with said film projection unit mounted upon said sound unit for the reproduction of sound motion picture film, said sound unit being constructed and arranged in a relatively flat lectern-shaped casing, a recording roller and sound heads mounted upon the side of said casing, said recording roller being mounted upon the outer end of a shaft having a horizontal axis of rotation, the side of said casing including an indentation within which said sound heads and recording roller are receved for disposing them under and in line with said film projecting means when said film projection and sound units are connected together, said shaft being rotatably mounted adjacent the top of said casing, a flywheel having a diameter greater than the height of said casing mounted upon an extension of said shaft within said casing and protruding a substantial distance above the upper surface of said casing of said sound unit, and a recess being provided within the bottom of said film projection unit within which said flywheel is received when said units are coupled together whereby said units are compactly assembled with said recording roller and said sound heads disposed at the standard film distance from said film projecting means.

2. A device as set forth in claim 1 wherein several inputs are provided upon said sound unit, and a selector switch is connected to said inputs and said unit for alternatively connecting said inputs to said combination sound-reproducing and recording unit.

3. A device as set forth in claim 1 wherein a connection is provided upon said sound-reproducing and recording unit for coupling it to the input of an audio frequency section of a radio.

4. A device as set forth in claim 1 wherein push-button switches are incorporated in said sound unit, for switching it from recording to reproducing operations, said push-button switches being disposed upon the cover plate of said sound unit, and other control elements being provided upon an inclined front wall of said sound unit.

5. A device as set forth in claim 1 wherein a portion of said casing contiguous to said indentation includes a concave surface in line with the path of said film when it is engaged with said film projecting means and sound heads and recording roller, said concave surface being removed from said recording roller and sound heads a predetermined distance to precisely adjust the length of the film loop to the proper slack length for engagement with said film projecting means and recording roller and sound heads when said film is pressed into contact with it before it is engaged with said film projecting means and said sound heads and said recording roller.

References Cited in the file of this patent

UNITED STATES PATENTS

| | | |
|---|---|---|
| 1,833,733 | Bradford | Nov. 24, 1931 |
| 1,949,457 | Dina | Mar. 6, 1934 |
| 1,971,454 | Loomis | Aug. 28, 1934 |
| 2,163,263 | Simons | June 20, 1939 |
| 2,172,235 | Aldinger | Sept. 5, 1939 |
| 2,322,369 | Lackoff et al. | June 22, 1943 |
| 2,694,107 | Camras | Nov. 9, 1954 |